US010616757B2

(12) United States Patent
Gu et al.

(10) Patent No.: US 10,616,757 B2
(45) Date of Patent: Apr. 7, 2020

(54) SYSTEM AND METHOD OF A MOBILE TERMINAL TO VOLTE ACCORDING TO SIM CARD AND RELATED MOBILE TERMINAL

(71) Applicant: TCL Communications (Ningbo) Co., Ltd., Ningbo (CN)

(72) Inventors: Qicai Gu, Ningbo (CN); Keyong Yu, Ningbo (CN); Yanming Lai, Ningbo (CN); Lei Shi, Ningbo (CN); Wenli Ouyang, Ningbo (CN); Gaoxiang Li, Ningbo (CN); Yajun Hu, Ningbo (CN); Lanying He, Ningbo (CN)

(73) Assignee: TCL Communications (Ningbo) Co., Ltd., Ningbo (CN)

( * ) Notice: Subject to any disclaimer, the term of this patent is extended or adjusted under 35 U.S.C. 154(b) by 0 days.

(21) Appl. No.: 16/487,101

(22) PCT Filed: Feb. 8, 2018

(86) PCT No.: PCT/CN2018/075765
§ 371 (c)(1),
(2) Date: Aug. 20, 2019

(87) PCT Pub. No.: WO2018/153268
PCT Pub. Date: Aug. 30, 2018

(65) Prior Publication Data
US 2019/0380024 A1 Dec. 12, 2019

(30) Foreign Application Priority Data
Feb. 21, 2017 (CN) .......................... 2017 1 0092802

(51) Int. Cl.
*H04M 3/00* (2006.01)
*H04W 8/24* (2009.01)
(Continued)

(52) U.S. Cl.
CPC ............... *H04W 8/24* (2013.01); *H04W 8/02* (2013.01); *H04W 8/183* (2013.01)

(58) Field of Classification Search
CPC ......... H04W 8/08; H04W 8/24; H04W 88/06; H04W 8/02; H04W 8/183; H04W 8/205
See application file for complete search history.

(56) References Cited

U.S. PATENT DOCUMENTS

2014/0051422 A1 2/2014 Mittal et al.

FOREIGN PATENT DOCUMENTS

| CN | 104581689 | 4/2015 |
|---|---|---|
| CN | 105682217 | 6/2016 |

(Continued)

OTHER PUBLICATIONS

International Search Report and the Written Opinion dated Apr. 27, 2018 From the International Searching Authority Re. Application No. PCT/CN2018/075765 and Its Translation of Search Report Into English. (9 Pages).

*Primary Examiner* — Charles T Shedrick

(57) ABSTRACT

Disclosed in the present invention are a method and system for selecting VOLTE according to an SIM card by a mobile terminal, and the mobile terminal. The method comprises: establishing a relationship table between a PLMN of a preset SIM card and ID values; performing a dynamic search by means of the PLMN of an SIM card; querying, in the relationship table, to determine whether the PLMN exists and whether the PLMN needs to be updated; when the PLMN exists and needs to be updated, obtaining an ID number of a current SIM card according to the relationship table; and when the PLMN does not exist, obtaining a default ID value; and obtaining a related configuration parameter according to the obtained ID.

15 Claims, 2 Drawing Sheets

(51) Int. Cl.
*H04W 8/02* (2009.01)
*H04W 8/18* (2009.01)

(56) References Cited

FOREIGN PATENT DOCUMENTS

| | | |
|---|---|---|
| CN | 106851610 | 6/2017 |
| WO | WO 2018/153268 | 8/2018 |

SYSTEM AND METHOD OF A MOBILE TERMINAL TO VOLTE ACCORDING TO SIM CARD AND RELATED MOBILE TERMINAL

RELATED APPLICATIONS

This application is a National Phase of PCT Patent Application No. PCT/CN2018/075765 having International filing date of Feb. 8, 2018, which claims the benefit of priority of Chinese Patent Application No. 201710092802.3, filed on Feb. 21, 2017. The contents of the above applications are all incorporated by reference as if fully set forth herein in their entirety.

FIELD AND BACKGROUND OF THE INVENTION

The present invention relates to an application technology of a smart terminal, and more particularly, to a system and method of a mobile terminal to select VOLTE according to a SIM card and a related mobile terminal.

IP Multimedia Subsystem (IMS) is a new multimedia business. It could meet the demands of the more novel and various multimedia businesses of the terminal customers.

Voice Over LTE (VOLTE) is a voice business based on IMS. IMS becomes the core network standard structure in the IP era because IMS supports different connecting technologies and various multimedia businesses. VOLTE, Voice Over LTE, is an IP data transmission technology. It does not require 2G/3G networks. All businesses are loaded on the 4G network such that the data and voice businesses could be unified by using the same network. In other words, 4G network not only provides high-speed data business but also a high-quality voice communication business. The latter requires the VOLTE technology to implement.

The most direct feeling that the VOLTE technology could give to the 4G user is that the connecting time becomes shorter and the voice communication effect become more natural. VOLTE is a peer-to-peer voice plan in all IP conditions based on the 4G network. VOLTE's voice quality could raise 40% compared to 2G and 3G voice communications because it adopts high-resolution encoding/decoding technologies. VOLTE could allow the user to connect in a shorter time (the waiting time after dialing, about 2 seconds), which is 50% shorter than that of 3G network. This connection time is 6-7 seconds in 2G network. Further, the disconnection may occur when using 2G and 3G networks but hardly happen when using VOLTE.

For the service provider, deploying VOLTE means moving forward to mobile broadband voice services. For the long-term aspect, this could provide the service provider with two advantages. One advantage is to raise the usage of wireless frequency band and thus lower the cost. This is because the usage of wireless frequency band of LTE is much better than the traditional way as to the voice business. For example, usage of wireless frequency band of LTE is four times of that of GSM.

The other advantage is to provide a more convenient solution to the user. VOLTE is clearly better than traditional CS voice service. First of all, high-resolution voice and video encoding/decoding raise the communication quality. Further, the connection time for VOLTE communication is enormously reduced. The test results indicate that the connection time of VOLTE communication is less than the half of the connection time of CS communication. In addition, the integration of the VOLTE and RCS could bring more businesses.

As to the stage of item software development, because the IMS arrangement parameters of IMS system of different service providers in different countries are different, the software containing different IMS arrangement information for different SIM cards of different service providers is required. This increases the maintaining costs for different software versions because the same software cannot support all kinds of SIM cards and the difference between different IMS arrangement information requires different software to realize registrations of VOLTE networks.

Therefore, it requires improvements and developments.

SUMMARY OF THE INVENTION

The embodiments of the present invention provide a method and a system of selecting VOLTE based on a SIM card by a mobile terminal and a mobile terminal. The present invention can configure different IMS configuration information and configure the correct VOLTE network according to PLMN values of different service providers and the mobile terminal when dynamically inserting different SIM cards. As a result, the same software is automatically compatible with different IMS configuration information and dynamically selects the VOLTE network based on the type of the SIM card, which greatly reduces the maintenance and management costs of the codes.

According to a first aspect of an embodiment of the present invention, a mobile terminal comprises a processor and a memory storing data and instructions executable by the processor to perform operation. The operations comprise:

establishing a mapping table respectively between Mobile Network Codes (MNC) and Mobile Country Codes (MCC) of predetermined Public Land Mobile Networks (PLMNs) of a subscriber identity module (SIM) card and predetermined identity (ID) values by an radio interface layer daemon (RILD) for an upper layer service at an application processor (AP) end of a mobile terminal in advance, and detecting insertion of the SIM card in a real-time manner;

acquiring PLMN information of the SIM card and dynamically looking up the mapping table to determine whether the PLMN exists and whether an update is required when detecting that the SIM card is dynamically inserted into the mobile terminal;

acquiring an ID value of the current SIM card according to the mapping table when the PLMN exists and the update is required, and acquiring a default ID value and providing a prompt when the PLMN does not exist;

sending a relevant AT control command and the ID value to a driver layer by a RILD service, the driver layer acquiring and parsing the command and the value, and notifying an upper layer service at a modulator/demodulator (MODEM) end through physically sharing a memory; and acquiring the corresponding ID value and setting a nonvolatile random-access memory (NVRAM) parameter on a bottom layer by the upper layer service at the MODEM end to complete a different VOLTE network registration.

Furthermore, the operation of acquiring the PLMN information of the SIM card and dynamically looking up the mapping table to determine whether the PLMN exists and whether the update is required when detecting that the SIM card is dynamically inserted into the mobile terminal comprises:

acquiring the PLMN information of the SIM card after the mobile terminal detects that the SIM card is dynamically inserted; and dynamically looking up the mapping table respectively between the MNCs and MCCs of PLMNs and the ID values by the mobile terminal to determine whether the PLMN exists and whether the update is required.

Furthermore, the operation of acquiring the ID value of the current SIM card according to the mapping table when the PLMN exists and the update is required, and acquiring the default ID value and providing a prompt when the PLMN does not exist comprises:

acquiring the ID value of the current SIM card according to the mapping table when it is determined that the PLMN exists and the update is required; and acquiring the default ID value and prompting a user in the form of a message box on a screen of the mobile terminal when it is determined that the PLMN does not exist.

Furthermore, the operation of acquiring the ID value of the current SIM card according to the mapping table when the PLMN exists and the update is required, and acquiring the default ID value and providing a prompt when the PLMN does not exist comprises:

controlling the mobile terminal to enter the normal VOLTE network initialization process when it is determined that the PLMN exists but the update is not required.

Furthermore, the operation of acquiring the corresponding ID value and setting the NVRAM parameter on the bottom layer by the upper layer service at the MODEM end to complete the different VOLTE network registration comprises:

pre-setting a mapping table between the ID values and different IMS configuration information; and acquiring the corresponding ID value and setting the NVRAM parameter on the bottom layer through looking up the mapping table between the ID values and the different IMS configuration information by the upper layer service at the MODEM end to complete the different VOLTE network registration.

According to a first aspect of an embodiment of the present invention, a method of selecting VOLTE based on a SIM card by a mobile terminal is disclosed. The method comprises:

establishing a mapping table respectively between Mobile Network Codes (MNC) and Mobile Country Codes (MCC) of predetermined Public Land Mobile Networks (PLMNs) of the SIM card and predetermined ID values by an RILD for an upper layer service at an AP end of a mobile terminal in advance, and detecting insertion of the SIM card in a real-time manner;

acquiring PLMN information of the SIM card and dynamically looking up the mapping table to determine whether the PLMN exists and whether an update is required when detecting that the SIM card is dynamically inserted into the mobile terminal;

acquiring an ID value of the current SIM card according to the mapping table when the PLMN exists and the update is required, and acquiring a default ID value and providing a prompt when the PLMN does not exist;

sending a relevant AT control command and the ID value to a driver layer by an RILD service, the driver layer acquiring and parsing the command and the value, and notifying an upper layer service at a MODEM end through physically sharing a memory; and acquiring the corresponding ID value and setting an NVRAM parameter on a bottom layer by the upper layer service at the MODEM end to complete a different VOLTE network registration.

Furthermore, the step of acquiring the PLMN information of the SIM card and dynamically looking up the mapping table to determine whether the PLMN exists and whether the update is required when detecting that the SIM card is dynamically inserted into the mobile terminal comprises:

acquiring the PLMN information of the SIM card after the mobile terminal detects that the SIM card is dynamically inserted; and dynamically looking up the mapping table respectively between the MNCs and MCCs of PLMNs and the ID values by the mobile terminal to determine whether the PLMN exists and whether the update is required.

Furthermore, the step of acquiring the ID value of the current SIM card according to the mapping table when the PLMN exists and the update is required, and acquiring the default ID value and providing a prompt when the PLMN does not exist comprises:

acquiring the ID value of the current SIM card according to the mapping table when it is determined that the PLMN exists and the update is required; and acquiring the default ID value and prompting a user in the form of a message box on a screen of the mobile terminal when it is determined that the PLMN does not exist.

Furthermore, the step of acquiring the ID value of the current SIM card according to the mapping table when the PLMN exists and the update is required, and acquiring the default ID value and providing a prompt when the PLMN does not exist comprises:

controlling the mobile terminal to enter the normal VOLTE network initialization process when it is determined that the PLMN exists but the update is not required.

Furthermore, the step of acquiring the corresponding ID value and setting the NVRAM parameter on the bottom layer by the upper layer service at the MODEM end to complete the different VOLTE network registration comprises:

pre-setting a mapping table between the ID values and different IMS configuration information; and acquiring the corresponding ID value and setting the NVRAM parameter on the bottom layer through looking up the mapping table between the ID values and the different IMS configuration information by the upper layer service at the MODEM end to complete the different VOLTE network registration.

According to another embodiment of the present invention, a system of selecting VOLTE based on a SIM card by a mobile terminal is disclosed. The system comprises one or more processors, a memory, and one or more application programs. The one or more application programs are stored in the memory and are configured to be executed by the one or more processors. The one or more application programs comprise:

a pre-establishment module configured to establish a mapping table respectively between MNCs and MCCs of predetermined PLMNs of the SIM card and predetermined ID values by an RILD for an upper layer service at an AP end of a mobile terminal in advance, and detect insertion of the SIM card in a real-time manner;

an acquisition and lookup module configured to acquire PLMN information of the SIM card and dynamically look up the mapping table to determine whether the PLMN exists and whether an update is required when detecting that the SIM card is dynamically inserted into the mobile terminal;

an acquisition and processing module configured to acquire an ID value of the current SIM card according to the mapping table when the PLMN exists and the update is required, and acquire a default ID value and provide a prompt when the PLMN does not exist;

a sending and notification module configured to allow an RILD service to send a relevant AT control command and the ID value to a driver layer, the driver layer acquiring and parsing the command and the value, and notifying an upper layer service at a MODEM end through physically sharing a memory; and a setting and registration module configured to allow the upper layer service at the MODEM end to acquire the corresponding ID value and set an NVRAM parameter on a bottom layer to complete a different VOLTE network registration.

Furthermore, the acquisition and lookup module comprise:

a detection and lookup unit configured to acquire the PLMN information of the SIM card after the mobile terminal detects that the SIM card is dynamically inserted; and a lookup and judgment unit configured to allow the mobile terminal to dynamically look up the mapping table respectively between the MNCs and MCCs of PLMNs and the ID values to determine whether the PLMN exists and whether the update is required.

Furthermore, the acquisition and processing module comprises:

a first processing unit configured to acquire the ID value of the current SIM card according to the mapping table when it is determined that the PLMN exists and the update is required; and a second processing unit configured to acquire the default ID value and prompt a user in the form of a message box on a screen of the mobile terminal when it is determined that the PLMN does not exist.

Furthermore, the acquisition and processing module further comprises:

a third processing unit configured to control the mobile terminal to enter the normal VOLTE network initialization process when it is determined that the PLMN exists but the update is not required.

Furthermore, the setting and registration module comprises:

a pre-setting unit configured to pre-set a mapping table between the ID values and different IMS configuration information; and a setting unit configured to allow the upper layer service at the Modem end to acquire the corresponding ID value, and set the NVRAM parameter on the bottom layer through looking up the mapping table between the ID values and the different IMS configuration information to complete the different VOLTE network registration.

The present invention discloses a method and a system of selecting VOLTE based on a SIM card by a mobile terminal and a mobile terminal. The method comprises: establishing a mapping table respectively between Mobile Network Codes (MNC) and Mobile Country Codes (MCC) of predetermined Public Land Mobile Networks (PLMNs) of the SIM card and predetermined ID values in advance, and detecting insertion of the SIM card in a real-time manner; acquiring PLMN information of the SIM card and looking up the mapping table to determine whether the PLMN exists and whether an update is required when detecting that the SIM card is dynamically inserted into the mobile terminal; acquiring an ID value of the current SIM card when the PLMN exists and the update is required, and acquiring a default ID value when the PLMN does not exist; sending a relevant AT control command and the ID value to a driver layer by an RILD service, the driver layer acquiring and parsing the command and the value, and notifying an upper layer service at a MODEM end through physically sharing a memory; and setting an NVRAM parameter on a bottom layer by the upper layer service at the MODEM end to complete a different VOLTE network registration. The present invention can configure different IMS configuration information and configure the correct VOLTE network according to PLMN values of different service providers and the mobile terminal when dynamically inserting different SIM cards. As a result, the same software is automatically compatible with different IMS configuration information and dynamically selects the VOLTE network based on the type of the SIM card, which greatly reduces the maintenance and management costs of the codes.

DESCRIPTION OF SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Figure 1:
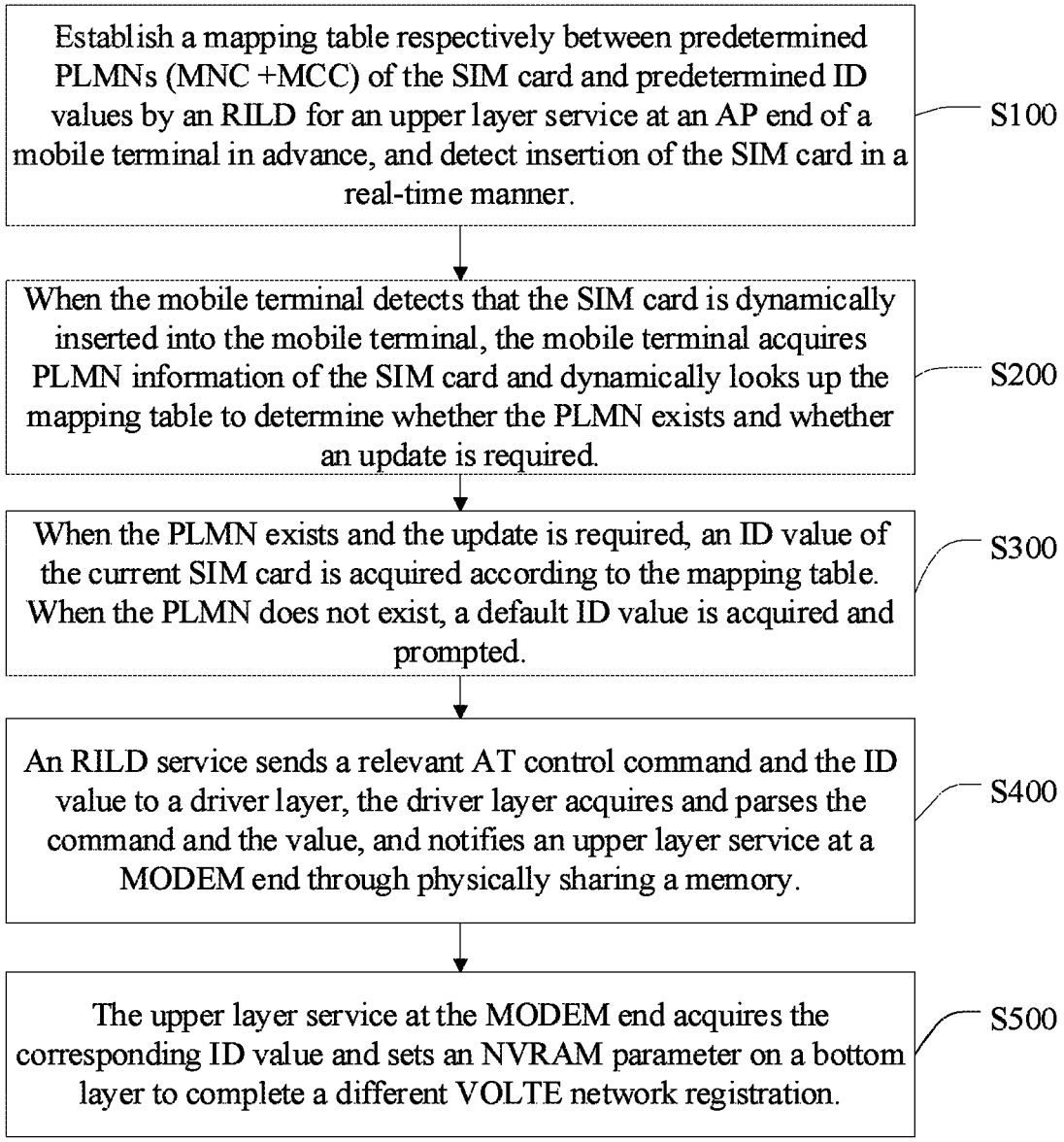
FIG. 1 is a flow chart illustrating a method of selecting VOLTE based on a SIM card by a mobile terminal according to a preferred embodiment of the present invention

Please refer to FIG. 1. FIG. 1 is a flow chart illustrating a method of selecting VOLTE based on a subscriber identity module (SIM) card by a mobile terminal according to a preferred embodiment of the present invention.

The method of selecting VOLTE based on the SIM card by the mobile terminal according to a preferred embodiment of the present invention comprises the following steps:

Step S100: Establish a mapping table respectively between Mobile Network Codes (MNC) and Mobile Country Codes (MCC) of predetermined Public Land Mobile Networks (PLMNs) of the SIM card and predetermined ID values by an RILD for an upper layer service at an AP end of a mobile terminal in advance, and detect insertion of the SIM card in a real-time manner.

The software program of the present invention is compatible with different SIM cards to realize compatibility of registrations of VOLTE networks provided by different service providers. The software program of the present invention also solves the problem of VOLTE network registration that different software programs are required for registrations due to different IMS configuration information between different SIM cards. In other words, the same software program can dynamically support different SIM cards, acquire corresponding predetermined IDs to acquire different IMS configuration information. As a result, the compatibility of registrations of VOLTE networks of different service providers can be accomplished.

The software structure of a mobile terminal is often divided into AP (application processor) end and MODEM end. The AP end is responsible for processing systems, such as Android system or Linux system related functions. The MODEM end is responsible for communication protocols of baseband processor, such as functions related to communication protocols.

RILD (radio interface layer daemon) is a daemon on the upper layer of a mobile terminal for communication related services, which is a daemon on the radio interface layer.

PLMN (Public Land Mobile Network) is a network established for providing land mobile communication services to the public by the government or government-approved service providers. PLMN=MCC+MNC. For example, the PLMN of China Mobile is 46000 and PLMN of China Unicom is 46001. PLMN is a wireless communication system directed to mobile user on the land, such as the users on transportation or pedestrians. This system could be an independent system but it is often connected to a fixed telephone system, such as PSTN. However, the mobile internet user is increasingly common and an ideal PLMN system should provide a mobile user with an equivalent service compared to the fixed network. This is a huge challenge in a complex topography because the base station cannot be located and maintained. In a city, there are a lot of barriers, such as buildings. Further, the background RF could introduce radiations of noises or interferences. Most of the modern systems utilize digital techniques instead of conventional analog techniques.

Step S200: When the mobile terminal detects that the SIM card is dynamically inserted into the mobile terminal, the mobile terminal acquires PLMN information of the SIM card and dynamically looks up the mapping table to determine whether the PLMN exists and whether an update is required.

Step S200 further comprises:

Step S210: After the mobile terminal detects that the SIM card is dynamically inserted, the mobile terminal acquires the PLMN information of the SIM card.

Step S220: The mobile terminal dynamically looks up the mapping table respectively between the MNCs and MCCs of PLMNs and the ID values to determine whether the PLMN exists and whether the update is required.

Registering different VOLTE networks with SIM cards of different service providers requires different IMS configuration information of the mobile terminal. The IMS configuration information comprises an IMS registration differentiation parameter, a VOLTE call related differentiation parameter: for example, the VOLTE voice coding process is in an AMR_NB mode or an AMR_WB mode, etc., and VOLTE voice service differentiation parameters: for example, whether to support a video call, whether to support a supplementary service, whether to support an emergency call, etc.

For example, the mapping table between the PLMNs and ID values:

| Service Provider | PLMN (MCC + MNC) | ID |
|---|---|---|
| China Mobile | 46000 | 1 |
| China Unicom | 46001 | 2 |
| Orange | 23433 | 3 |
| VODAFONE | 23415 | 4 |

Step S300: When the PLMN exists and the update is required, an ID value of the current SIM card is acquired according to the mapping table. When the PLMN does not exist, a default ID value is acquired and prompted.

Step S300 further comprises:

Step S310: When it is determined that the PLMN exists and the update is required, the ID value of the current SIM card is acquired according to the mapping table.

Step S320: When it is determined that the PLMN does not exist, the default ID value is acquired, and a user is prompted in the form of a message box on a screen of the mobile terminal.

Step 300 further comprises: When it is determined that the PLMN exists but the update is not required, the mobile terminal is controlled to enter the normal VOLTE network initialization process.

When the SIM card is dynamically inserted, the PLMN information of the SIM card is acquired. The mapping table between the MNCs and MCCs of PLMNs and the predetermined IDs is looked up dynamically to determine whether the PLMN exists and whether the update is required. If the PLMN exists and the update is required, the ID value of the current SIM card is acquired and the process goes to step S400. If the PLMN does not exist, the default ID value is acquired and a prompt is provided and the process goes to step S400. If the PLMN exists but the update is not required, the normal VOLTE network initialization process is entered and the process ends.

Step S400: An RILD service sends a relevant AT control command and the ID value to a driver layer, the driver layer acquires and parses the command and the value, and notifies an upper layer service at a MODEM end through physically sharing a memory.

A modem is a computer hardware that can translates digital signals of a computer into pulse signals that can be transmitted along a regular telephone line, the pulse signals in turn can be received by another modem at the other end of the line and translated into a computer understandable language.

Step S500: The upper layer service at the MODEM end acquires the corresponding ID value and sets an NVRAM parameter on a bottom layer to complete a different VOLTE network registration.

Non-volatile random access memory (NVRAM) is a kind of RAM that can still retain data after power is turned off. If the non-volatile memory is explained in a colloquial manner, it means a random access memory in which the data stored is not lost after the power is turned off.

Step S500 further comprises:

Step S510 Pre-set a mapping table between the ID values and different IMS configuration information.

Step S520: The upper layer service at the Modem end acquires the corresponding ID value, and sets the NVRAM parameter on the bottom layer through looking up the mapping table between the ID values and the different IMS configuration information to complete the different VOLTE network registration.

Figure 2:
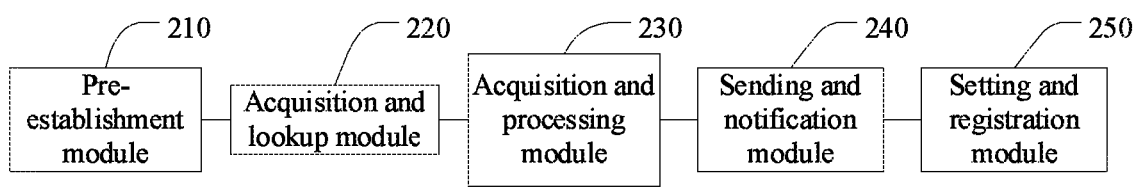
FIG. 2 is a functional principle diagram illustrating a system of selecting VOLTE based on a SIM card by a mobile terminal according to a preferred embodiment of the present invention.

Based on the foregoing method embodiment, the present invention further provides a system for selecting VOLTE based on a SIM card by a mobile terminal. As shown in FIG. 2, the system comprises:

A pre-establishment module 210 configured to establish a mapping table respectively between Mobile Network Codes (MNC) and Mobile Country Codes (MCC) of predetermined Public Land Mobile Networks (PLMNs) of the SIM card and predetermined ID values by an RILD for an upper layer service at an AP end of a mobile terminal in advance, and detect insertion of the SIM card in a real-time manner.

An acquisition and lookup module 220 configured to acquire PLMN information of the SIM card and dynamically look up the mapping table to determine whether the PLMN exists and whether an update is required when detecting that the SIM card is dynamically inserted into the mobile terminal.

An acquisition and processing module 230 configured to acquire an ID value of the current SIM card according to the mapping table when the PLMN exists and the update is required, and acquire a default ID value and provide a prompt when the PLMN does not exist.

A sending and notification module 240 configured to allow an RILD service to send a relevant AT control command and the ID value to a driver layer, the driver layer acquiring and parsing the command and the value, and notifying an upper layer service at a MODEM end through physically sharing a memory.

A setting and registration module 250 configured to allow the upper layer service at the MODEM end to acquire the corresponding ID value and set an NVRAM parameter on a bottom layer to complete a different VOLTE network registration.

In greater detail, the acquisition and lookup module 220 further comprises:

A detection and lookup unit configured to acquire the PLMN information of the SIM card after the mobile terminal detects that the SIM card is dynamically inserted.

A lookup and judgment unit configured to allow the mobile terminal to dynamically look up the mapping table respectively between the MNCs and MCCs of PLMNs and the ID values to determine whether the PLMN exists and whether the update is required.

In greater detail, the acquisition and processing module 230 further comprises:

A first processing unit configured to acquire the ID value of the current SIM card according to the mapping table when it is determined that the PLMN exists and the update is required.

A second processing unit configured to acquire the default ID value and prompt a user in the form of a message box on a screen of the mobile terminal when it is determined that the PLMN does not exist.

In greater detail, the acquisition and processing module 230 further comprises:

A third processing unit configured to control the mobile terminal to enter the normal VOLTE network initialization process when it is determined that the PLMN exists but the update is not required.

In greater detail, the setting and registration module 250 further comprises:

A pre-setting unit configured to pre-set a mapping table between the ID values and different IMS configuration information.

A setting unit configured to allow the upper layer service at the Modem end to acquire the corresponding ID value, and set the NVRAM parameter on the bottom layer through looking up the mapping table between the ID values and the different IMS configuration information to complete the different VOLTE network registration.

Accordingly, the present invention discloses a method and a system of selecting VOLTE based on a SIM card by a mobile terminal and a mobile terminal. The method comprises: establishing a mapping table respectively between predetermined PLMNs (MNC+MCC) of the SIM card and predetermined ID values in advance, and detecting insertion of the SIM card in a real-time manner; acquiring PLMN information of the SIM card and looking up the mapping table to determine whether the PLMN exists and whether an update is required when detecting that the SIM card is dynamically inserted into the mobile terminal; acquiring an ID value of the current SIM card when the PLMN exists and the update is required, and acquiring a default ID value when the PLMN does not exist; sending a relevant AT control command and the ID value to a driver layer by an RILD service, the driver layer acquiring and parsing the command and the value, and notifying an upper layer service at a MODEM end through physically sharing a memory; and setting an NVRAM parameter on a bottom layer by the upper layer service at the MODEM end to complete a different VOLTE network registration. The present invention can configure different IMS configuration information and configure the correct VOLTE network according to PLMN values of different service providers and the mobile terminal when dynamically inserting different SIM cards. As a result, the same software is automatically compatible with different IMS configuration information and dynamically selects the VOLTE network based on the type of the SIM card, which greatly reduces the maintenance and management costs of the codes.

The embodiments of the present invention further provide a storage medium that stores a computer program. The computer program causes a computer to execute the method of selecting VOLTE based on the SIM card by the mobile terminal as described previously.

A person skilled in the art would understand that all or part of the process flow for implementing the method of the above embodiments can be completed by instructing related hardware (such as a processor, a controller, etc.) through the computer program. The program may be stored in a computer readable storage medium. The program may comprise the process flow of the above various method embodiments when being executed. The storage medium may be a memory, a magnetic disk, an optical disc, or the like.

Figure 3:
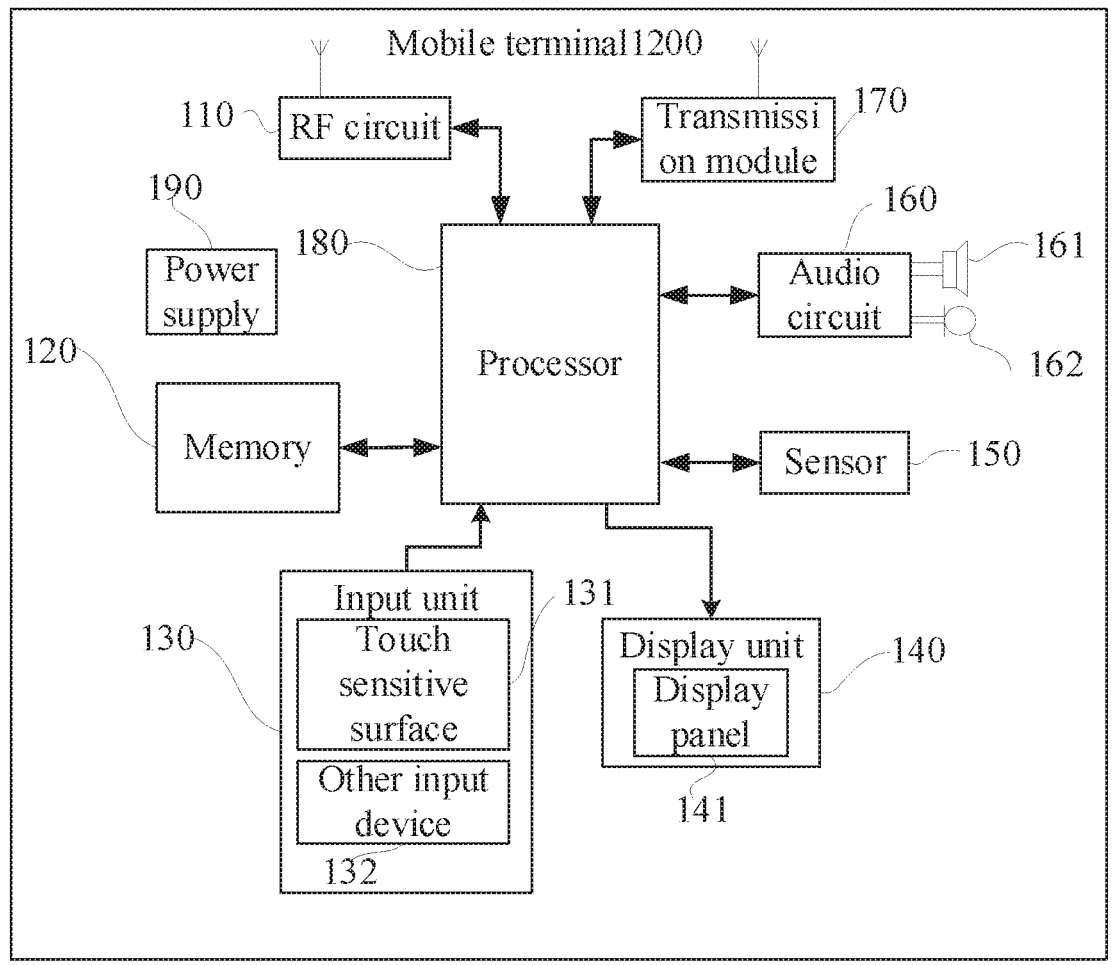
FIG. 3 is a structural schematic diagram of a mobile terminal according to an embodiment of the present invention.

FIG. 3 is a block diagram of a detailed structure of a mobile terminal according to an embodiment of the present invention. The mobile terminal can be used to implement the method and system of selecting VOLTE based on the SIM card by the mobile terminal according to the foregoing embodiments. A mobile terminal 1200 may be a smartphone or a tablet.

As shown in FIG. 3, the mobile terminal 1200 may comprise components, such as a radio frequency (RF) circuit 110, a memory 120 including one or more (only one is shown in the figure) computer readable storage media, an input unit 130, a display unit 140, a sensor 150, an audio circuit 160, a transmission module 170, a processor 180 including one or more (only one is shown in the figure) processing cores, a power supply 190, and the like. It will be understood by those skilled in the art that the mobile terminal 1200 is not limited to the structure of the mobile terminal 1200 shown in FIG. 3, and the mobile terminal 1200 may comprise more or less components than those illustrated, or a combination of some of the components, or have a different component arrangement.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal 1200 may further include a camera (a front camera or a rear camera), a Bluetooth module, and the like, which are not further described herein. Specifically, in this embodiment, the display unit of the terminal 1200 is a touch screen display, and the terminal 1200 further includes a memory and one or more programs. The one or more programs are stored in the memory and configured to be executed by one or more processors. The one or more programs contain instructions used for performing the operations as follows.

A mapping table respectively between Mobile Network Codes (MNC) and Mobile Country Codes (MCC) of predetermined Public Land Mobile Networks (PLMNs) of a subscriber identity module (SIM) card and predetermined identity (ID) values is established by an radio interface layer daemon (RILD) for an upper layer service at an application (AP) end of a mobile terminal in advance, and detecting insertion of the SIM card in a real-time manner.

PLMN information of the SIM card is acquired, and dynamically looking up the mapping table to determine whether the PLMN exists and whether an update is required when detecting that the SIM card is dynamically inserted into the mobile terminal is performed.

An ID value of the current SIM card is acquired according to the mapping table when the PLMN exists and the update is required. A default ID value is acquired and a prompt is provided when the PLMN does not exist.

A relevant AT control command and the ID value are sent to a driver layer by a RILD service. The driver layer acquires and parses the command and the value, and notifies an upper layer service at a modulator/demodulator (MODEM) end through physically sharing a memory.

The corresponding ID value is acquired and a nonvolatile random-access memory (NVRAM) parameter is set on a bottom layer by the upper layer service at the MODEM end to complete a different VOLTE network registration.

The operation of acquiring the PLMN information of the SIM card and dynamically looking up the mapping table to determine whether the PLMN exists and whether the update is required when detecting that the SIM card is dynamically inserted into the mobile terminal comprises:

acquiring the PLMN information of the SIM card after the mobile terminal detects that the SIM card is dynamically inserted; and dynamically looking up the mapping table respectively between the MNCs and MCCs of PLMNs and the ID values by the mobile terminal to determine whether the PLMN exists and whether the update is required.

The operation of acquiring the ID value of the current SIM card according to the mapping table when the PLMN exists and the update is required, and acquiring the default ID value and providing a prompt when the PLMN does not exist comprises:

acquiring the ID value of the current SIM card according to the mapping table when it is determined that the PLMN exists and the update is required; and acquiring the default ID value and prompting a user in the form of a message box on a screen of the mobile terminal when it is determined that the PLMN does not exist.

The operation of acquiring the ID value of the current SIM card according to the mapping table when the PLMN exists and the update is required, and acquiring the default ID value and providing a prompt when the PLMN does not exist comprises:

controlling the mobile terminal to enter the normal VOLTE network initialization process when it is determined that the PLMN exists but the update is not required.

The operation of acquiring the corresponding ID value and setting the NVRAM parameter on the bottom layer by the upper layer service at the MODEM end to complete the different VOLTE network registration comprises:

pre-setting a mapping table between the ID values and different IMS configuration information; and acquiring the corresponding ID value and setting the NVRAM parameter on the bottom layer through looking up the mapping table between the ID values and the different IMS configuration information by the upper layer service at the MODEM end to complete the different VOLTE network registration.

Above are embodiments of the present invention, which does not limit the scope of the present invention. Any modifications, equivalent replacements or improvements within the spirit and principles of the embodiment described above should be covered by the protected scope of the invention.

What is claimed is:

1. A mobile terminal comprising a processor and a memory storing data and instructions executable by the processor to perform operation, the operations comprising:

establishing a mapping table respectively between Mobile Network Codes (MNC) and Mobile Country Codes (MCC) of predetermined Public Land Mobile Networks (PLMNs) of a subscriber identity module (SIM) card and predetermined identity (ID) values by an radio interface layer daemon (RILD) for an upper layer service at an application processor (AP) end of a mobile terminal, and detecting insertion of the SIM card in a real-time manner;

acquiring PLMN information of the SIM card and dynamically looking up the mapping table to determine whether the PLMN exists and whether an update is required when detecting that the SIM card is dynamically inserted into the mobile terminal;

acquiring an ID value of the current SIM card according to the mapping table when the PLMN exists and the update is required, and acquiring a default ID value and providing a prompt when the PLMN does not exist;

sending a relevant AT control command and the ID value to a driver layer by a RILD service, the driver layer acquiring and parsing the command and the value, and notifying an upper layer service at a modulator/demodulator (MODEM) end through physically sharing a memory; and acquiring the corresponding ID value and setting a non-volatile random-access memory (NVRAM) parameter on a bottom layer by the upper layer service at the MODEM end to complete a different VOLTE network registration.

2. The mobile terminal of claim 1, wherein the operation of acquiring the PLMN information of the SIM card and dynamically looking up the mapping table to determine whether the PLMN exists and whether the update is required when detecting that the SIM card is dynamically inserted into the mobile terminal comprises:

acquiring the PLMN information of the SIM card after the mobile terminal detects that the SIM card is dynamically inserted; and dynamically looking up the mapping table respectively between the MNCs and MCCs of PLMNs and the ID values by the mobile terminal to determine whether the PLMN exists and whether the update is required.

3. The mobile terminal of claim 1, wherein the operation of acquiring the ID value of the current SIM card according to the mapping table when the PLMN exists and the update is required, and acquiring the default ID value and providing a prompt when the PLMN does not exist comprises:

acquiring the ID value of the current SIM card according to the mapping table when it is determined that the PLMN exists and the update is required; and acquiring the default ID value and prompting a user in the form of a message box on a screen of the mobile terminal when it is determined that the PLMN does not exist.

4. The mobile terminal of claim 1, wherein the operation of acquiring the ID value of the current SIM card according to the mapping table when the PLMN exists and the update is required, and acquiring the default ID value and providing a prompt when the PLMN does not exist comprises:

controlling the mobile terminal to enter the normal VOLTE network initialization process when it is determined that the PLMN exists but the update is not required.

5. The mobile terminal of claim 1, wherein the operation of acquiring the corresponding ID value and setting the NVRAM parameter on the bottom layer by the upper layer service at the MODEM end to complete the different VOLTE network registration comprises:

pre-setting a mapping table between the ID values and different IMS configuration information; and acquiring the corresponding ID value and setting the NVRAM parameter on the bottom layer through looking up the mapping table between the ID values and the different IMS configuration information by the upper layer service at the MODEM end to complete the different VOLTE network registration.

6. A method of selecting VOLTE based on a SIM card by a mobile terminal comprising:

establishing a mapping table respectively between Mobile Network Codes (MNC) and Mobile Country Codes (MCC) of predetermined PLMNs of a subscriber identity module (SIM) card and predetermined ID values by an RILD for an upper layer service at an AP end of a mobile terminal, and detecting insertion of the SIM card in a real-time manner;

acquiring PLMN information of the SIM card and dynamically looking up the mapping table to determine whether the PLMN exists and whether an update is required when detecting that the SIM card is dynamically inserted into the mobile terminal;

acquiring an ID value of the current SIM card according to the mapping table when the PLMN exists and the update is required, and acquiring a default ID value and providing a prompt when the PLMN does not exist;

sending a relevant AT control command and the ID value to a driver layer by an RILD service, the driver layer acquiring and parsing the command and the value, and notifying an upper layer service at a MODEM end through physically sharing a memory; and acquiring the corresponding ID value and setting an NVRAM parameter on a bottom layer by the upper layer service at the MODEM end to complete a different VOLTE network registration.

7. The method of claim 6, wherein the step of acquiring the PLMN information of the SIM card and dynamically looking up the mapping table to determine whether the PLMN exists and whether the update is required when detecting that the SIM card is dynamically inserted into the mobile terminal comprises:

acquiring the PLMN information of the SIM card after the mobile terminal detects that the SIM card is dynamically inserted; and dynamically looking up the mapping table respectively between the MNCs and MCCs of PLMNs and the ID values by the mobile terminal to determine whether the PLMN exists and whether the update is required.

8. The method of claim 6, wherein the step of acquiring the ID value of the current SIM card according to the mapping table when the PLMN exists and the update is required, and acquiring the default ID value and providing a prompt when the PLMN does not exist comprises:

acquiring the ID value of the current SIM card according to the mapping table when it is determined that the PLMN exists and the update is required; and acquiring the default ID value and prompting a user in the form of a message box on a screen of the mobile terminal when it is determined that the PLMN does not exist.

9. The method of claim 6, wherein the step of acquiring the ID value of the current SIM card according to the mapping table when the PLMN exists and the update is required, and acquiring the default ID value and providing a prompt when the PLMN does not exist comprises:

controlling the mobile terminal to enter the normal VOLTE network initialization process when it is determined that the PLMN exists but the update is not required.

10. The method of claim 6, wherein the step of acquiring the corresponding ID value and setting the NVRAM parameter on the bottom layer by the upper layer service at the MODEM end to complete the different VOLTE network registration comprises:

pre-setting a mapping table between the ID values and different IMS configuration information; and acquiring the corresponding ID value and setting the NVRAM parameter on the bottom layer through looking up the mapping table between the ID values and the different IMS configuration information by the upper layer service at the MODEM end to complete the different VOLTE network registration.

11. A system of selecting VOLTE based on a SIM card by a mobile terminal comprising:
  one or more processors;
  a memory; and
  one or more application programs, wherein the one or more application programs are stored in the memory and are configured to be executed by the one or more processors, wherein the one or more application programs comprise:
  a pre-establishment module configured to establish a mapping table respectively between Mobile Network Codes (MNC) and Mobile Country Codes (MCC) of predetermined Public Land Mobile Networks (PLMNs) of a subscriber identity module (SIM) card and predetermined ID values by an RILD for an upper layer service at an AP end of a mobile terminal, and detect insertion of the SIM card in a real-time manner;
  an acquisition and lookup module configured to acquire PLMN information of the SIM card and dynamically look up the mapping table to determine whether the PLMN exists and whether an update is required when detecting that the SIM card is dynamically inserted into the mobile terminal;
  an acquisition and processing module configured to acquire an ID value of the current SIM card according to the mapping table when the PLMN exists and the update is required, and acquire a default ID value and provide a prompt when the PLMN does not exist;
  a sending and notification module configured to allow an RILD service to send a relevant AT control command and the ID value to a driver layer, the driver layer acquiring and parsing the command and the value, and notifying an upper layer service at a MODEM end through physically sharing a memory; and
  a setting and registration module configured to allow the upper layer service at the MODEM end to acquire the corresponding ID value and set an NVRAM parameter on a bottom layer to complete a different VOLTE network registration.

12. The system of claim 11, wherein the acquisition and lookup module comprise:
  a detection and lookup unit configured to acquire the PLMN information of the SIM card after the mobile terminal detects that the SIM card is dynamically inserted; and
  a lookup and judgment unit configured to allow the mobile terminal to dynamically look up the mapping table respectively between the MNCs and MCCs of PLMNs and the ID values to determine whether the PLMN exists and whether the update is required.

13. The system of claim 11, wherein the acquisition and processing module comprises:
  a first processing unit configured to acquire the ID value of the current SIM card according to the mapping table when it is determined that the PLMN exists and the update is required; and
  a second processing unit configured to acquire the default ID value and prompt a user in the form of a message box on a screen of the mobile terminal when it is determined that the PLMN does not exist.

14. The system of claim 11, wherein the acquisition and processing module further comprises:
  a third processing unit configured to control the mobile terminal to enter the normal VOLTE network initialization process when it is determined that the PLMN exists but the update is not required.

15. The system of claim 11, wherein the setting and registration module comprises:
  a pre-setting unit configured to pre-set a mapping table between the ID values and different IMS configuration information; and
  a setting unit configured to allow the upper layer service at the Modem end to acquire the corresponding ID value, and set the NVRAM parameter on the bottom layer through looking up the mapping table between the ID values and the different IMS configuration information to complete the different VOLTE network registration.

* * * * *